M. G. Hubbard,
Motor.
N° 33,305.  Patented Sep. 17, 1861.
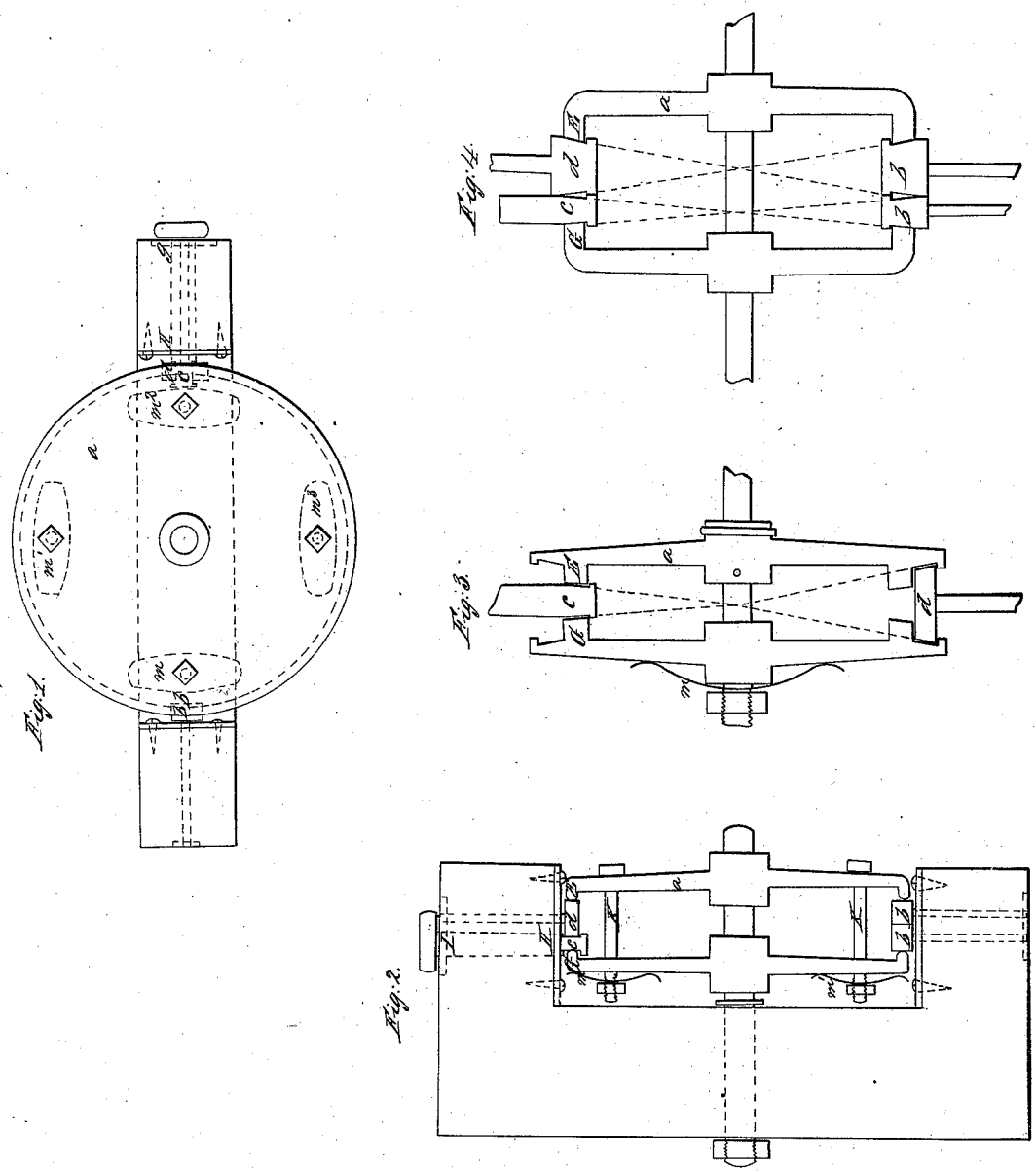
Witnesses:
Geo. Barker
A. Smith
Inventor:
M. G. Hubbard

UNITED STATES PATENT OFFICE.

MOSES G. HUBBARD, OF SYRACUSE, NEW YORK.

IMPROVEMENT IN DRIVING-POWER FOR SPINNERS.

Specification forming part of Letters Patent No. 33,305, dated September 17, 1861.

*To all whom it may concern:*

Be it known that I, MOSES G. HUBBARD, of the city of Syracuse, and State of New York, have invented certain new and useful improvements in anti-friction driving and speeding powers for spinners, propellers, buzz-saws, or other highly-speeded machinery; and I do hereby declare and ascertain the same as follows, reference being had to the accompanying drawings, in which—

Figure 1 is a side view. Fig. 2 is a section through its center, and Fig. 3 is another modification of the device, but subject to more friction than the arrangement shown in Fig. 1. Fig. 4 represents a theoretically perfect shape of the driving-surfaces.

The same letters refer to like parts in all the drawings.

The object of my invention is to drive a highly-speeded shaft with the least possible friction for any desired purpose, as in spinners, propellers, buzz-saws, and various other purposes.

This invention consists in the employment of a driving-wheel $a$, arranged on a shaft which is suspended in any suitable framework. This driving-wheel is composed of two driving-rims E and G, pressed together by a yielding force. Between these two driving-rims, on one side, is a pair of rollers $b\ b$, and between said rims, on the other side, I locate the driving-roller $d$ and the end of the shaft C to be speeded. The speeded shaft C is sustained in the boxes H and I, and its end being pressed between the driving-surfaces G and D it is revolved with a degree of speed proportioned to its size, and with a degree of power proportioned to the amount of force with which the driving-rims are pressed together. The pair of rollers $b\ b$ are merely used to keep the driving-rims parallel with each other. It is obvious that by this arrangement when the drive-wheel is revolved the driving-rim G moves in one direction, and the driving-surface of the roller $d$ moves in an opposite direction, and this reverse movement of the two surfaces causes the speeded shaft C to revolve without any other friction than the slight obstruction presented by the smooth driving-surfaces, the driving-power of which may be increased by increasing the pressure of the driving-surfaces on the speeded shaft. For this purpose I connect the two driving-rims E and G by bolts K K' K² K³. Under the nuts of these bolts I place springs M M' M² M³, which press the driving-rims together and by their elasticity compensate for any slight imperfection of the parts. These driving-surfaces may be pressed together in any convenient manner, so that the force is elastic, which I find to be absolutely necessary. If all the parts were absolutely perfect, the end of the speeded shaft would of course remain uniformly in the same relative position between the driving-surfaces without any other support; but the slight imperfections inseparable from all mechanical work render it necessary that this end of the speeded shaft should be supported in a direction perpendicular to the main drive-wheel shaft, in order to prevent its working out of line. As the drive-wheel if permanent laterally would afford lateral support to this end of the speeded shaft, it need not have any other lateral support; but I prefer to make a fixed support of this end of the speeded shaft by confining it in an ordinary journal-box H, and leave the drive-wheel free laterally, so that it will at all times conform precisely to the position of the speeded shaft, which avoids all unnecessary resistance from any of the parts getting out of line or binding.

Having fully described my invention, what I claim as new, and desire to secure by Letters Patent, is—

Supporting the end of the speeded shaft in the stationary journal-box H and driving it by means of the driving-rims, substantially as and for the purpose set forth.

M. G. HUBBARD.

Witnesses:
ANDREW J. SMITH,
GEO. BARKER.